United States Patent [19]

de Buhr et al.

[11] 4,184,558

[45] Jan. 22, 1980

[54] SUPPORT FOR A PTO HOOKUP ASSEMBLY

[75] Inventors: Harold E. de Buhr; Merlyn D. Bass, both of Ottumwa; Ronald N. Grimstad, Centerville, all of Iowa

[73] Assignee: Deere & Company, Moline, Ill.

[21] Appl. No.: 905,725

[22] Filed: May 15, 1978

[51] Int. Cl.² .......................... B60D 1/08; F16D 3/00
[52] U.S. Cl. ................................ 180/14 R; 172/275; 180/53 C; 280/477
[58] Field of Search .............. 180/14 R, 53 CD, 53 R; 280/477; 24/249 R; 64/1.5; 294/92; 172/272, 275

[56] References Cited

U.S. PATENT DOCUMENTS

| 1,686,655 | 10/1928 | Ellerbeck | 24/249 R |
|---|---|---|---|
| 2,885,015 | 5/1959 | Koch et al. | 180/14 R |
| 3,007,535 | 11/1961 | Lippke | 180/53 D |
| 3,014,545 | 12/1961 | Shepley | 180/14 R |
| 3,557,892 | 5/1969 | Burrough | 180/14 R |
| 4,020,913 | 5/1977 | Yatcilla | 180/14 R |
| 4,058,990 | 11/1977 | Von Allwörden | 180/14 R |
| 4,071,105 | 1/1978 | Von Allwörden | 180/14 R |

FOREIGN PATENT DOCUMENTS 452565 8/1936 United Kingdom .................. 24/249 R Primary Examiner—Joseph F. Peters, Jr.
Assistant Examiner—Donn McGiehan

[57] ABSTRACT

An agricultural implement has a forwardly extending tongue connectible to the drawbar of a towing tractor and includes a fore and aft drive shaft that is disposed above the tongue and adapted to be connected to the PTO output shaft of the tractor by a PTO hookup assembly that includes front and rear universal joints respectively connectible to the implement drive shaft. When the hookup assembly is not connected to the tractor, the front end of the assembly is supported on the implement by a support that includes a support member swingably mounted on the implement tongue for shifting between a folded storage position and an upright operative position. A hook-like retainer member is mounted on the upper end of the support member and is shiftable between a generally upright position, wherein it is capable of receiving the central body portion of the hookup assembly, and a canted position wherein the hookup assembly cannot be withdrawn from the retainer member so that the hookup assembly is locked to the support.

10 Claims, 4 Drawing Figures

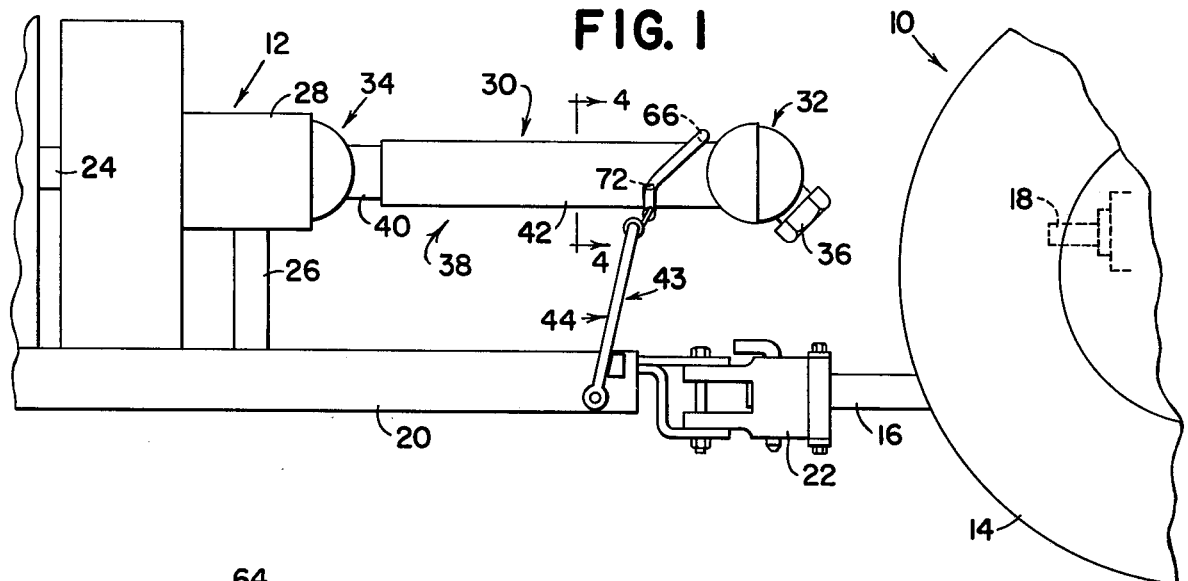
FIG. 1
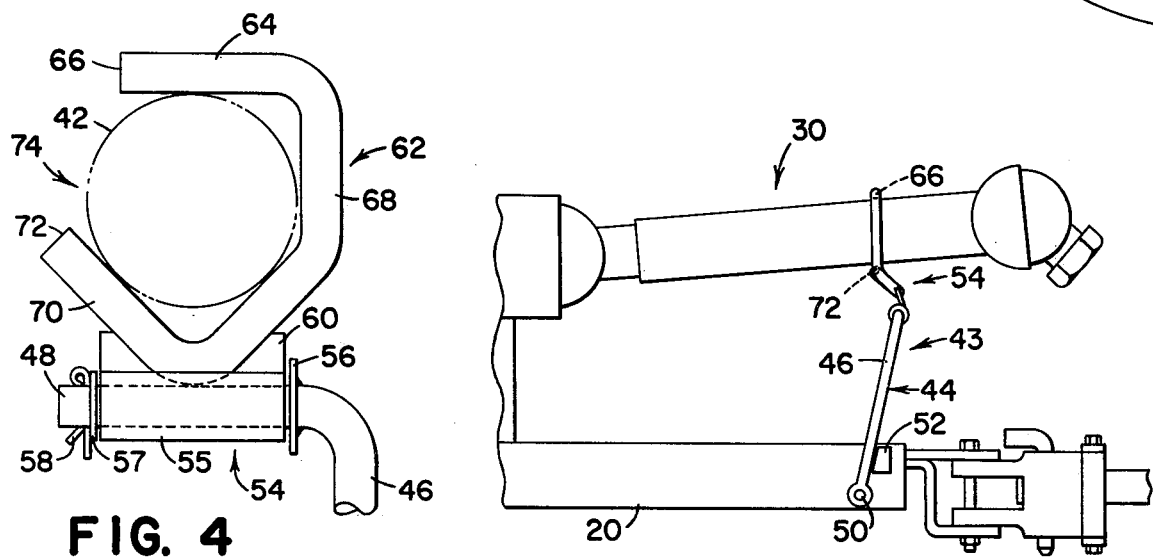
FIG. 4
FIG. 3
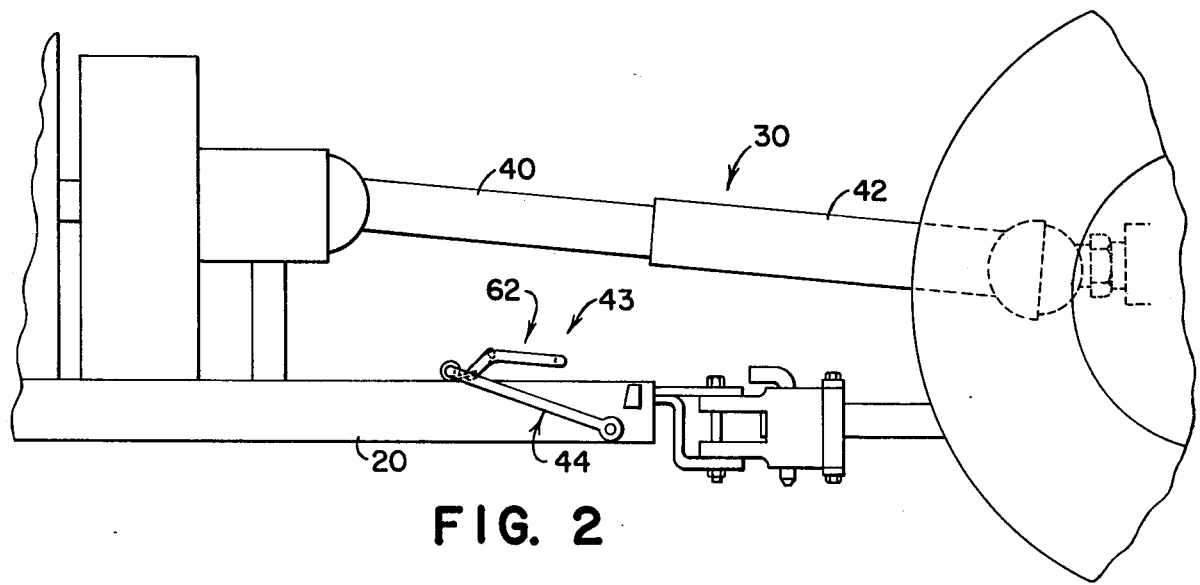
FIG. 2

SUPPORT FOR A PTO HOOKUP ASSEMBLY

BACKGROUND OF THE INVENTION

This invention relates to an agricultural implement that is towed and powered by a tractor and more particularly to improved means for supporting the free end of a PTO hookup assembly on the implement when the hookup assembly is disconnected from the tractor.

As is well known, agricultural machines, that are towed by a tractor and powered from the tractor power take-off, conventionally include a main fore and aft drive shaft that is connected to the tractor PTO output shaft by a PTO hookup assembly having a pair of universal joints respectively adjacent the forward and rearward ends of the hookup assembly, the yoke of the forward universal joint conventionally including an internally splined member that is mateable with the externally splined tractor PTO shaft. However, since the hookup assembly does include a pair of universal joints and is normally not supported on the implement except by its connection through the rear universal joint to the implement drive shaft, when the implement is separated from the tractor, the forward free end of the hookup assembly is free to dangle. This, of course, creates a potential for damaging the hookup assembly and permits the forward universal joint to be exposed to the mud and the elements.

To overcome such a situation, it is known to provide retainers for the forward ends of the hookup assemblies, two such retainers being disclosed in U.S. Pat. Nos. 2,885,015 and 3,014,545. However, with the increasing size of farm implements and the corresponding increase in the size of the drive line components to transmit the increased power consumed by such larger machines, there has been a need for an improved support of the above general type.

SUMMARY OF THE INVENTION

According to the present invention, there is provided an improved support for supporting the forward free end of an agricultural implement PTO hookup assembly when the implement is disconnected from a tractor.

An important feature of the invention resides in the fact that the support is swingable to a folded position on top of the implement tongue when it is not in use so that it will not be in the way when the machine is operating. Another feature resides in the fact that the support is swingable into an upright overcenter position when it is in use, wherein the weight of the support and the hookup assembly carried thereby maintains the support in its operative position.

Another feature of the invention resides in the provision of a retainer that firmly clamps and holds the hookup assembly when the assembly is not in use. Also, the support, when in use, holds the hookup assembly in a generally horizontal or downwardly and rearwardly inclined position, so that it tends to remain telescoped to its minimum length. Still another feature of the invention resides in the fact that the support will accommodate different size hookup assemblies and will clamp the hookup assembly in its stored position regardless of the diameter of the assembly.

BRIEF DESCRIPTION OF THE DRAWINGS

FIG. 1 is a side elevation view of the rearward end of a tractor and the forward end of an implement connected to the tractor drawbar, disclosing an embodiment of the improved support holding the PTO hookup assembly in its stored position.

FIG. 2 is a view similar to FIG. 1 but showing the PTO hookup assembly connected to the tractor PTO output shaft, with the support in its non-operating position.

FIG. 3 is a side elevation view of the support and the PTO hookup assembly with the support positioned to accommodate mounting of the hookup assembly on the support.

FIG. 4 is an enlarged rear view of the upper end of the support as viewed along the line 4—4 of FIG. 1 showing the support in a locked condition wherein it firmly clamps the hookup assembly, only the outline of which is shown.

Description of the Preferred Embodiment

The invention is embodied in a tractor trailing implement combination, only the rearward end of the tractor, which is indicated generally by the numeral 10, being shown, and only the forward end of the implement, which is indicated generally by the numeral 12, being shown. The tractor includes a pair of transversely spaced rear wheels 14 and a drawbar 16 extending rearwardly from the tractor frame between the wheels 14. The tractor also includes a rearward PTO output shaft 18 above the drawbar, all of the above being more or less standard agricultural tractor construction.

The implement 12 includes a generally fore and aft tongue 20 that is connected to the tractor drawbar 16 by means of a hitch adapter 22, the function and construction of the hitch adapter being described in greater detail in U.S. Pat. No. 3,557,892, also assigned to the assignee herein. The implement also includes a main input drive shaft 24 that extends above the tongue 20 and is journalled and supported on a drive shaft support 26 extending upwardly from the tongue. The drive shaft 24 is conventionally shielded, the forward drive shaft shield 28 being illustrated in the drawings.

The forward end of the drive shaft 24 is releasably connectible to the tractor PTO output shaft 18 by a PTO hookup assembly indicated in its entirety by the numeral 30. Such hookup assemblies are well known, and the more modern assemblies are fully shielded to prevent entanglement of a bystander or operator of the machinery in the rotating drive line. The hookup assembly includes front and rear universal joints 32 and 34, only the exterior shielded portions of which are shown since the construction of the hookup assembly itself and the universal joint are well known. An internally splined coupler 36 is provided on the front yoke of the front universal joint for releasably connecting the hookup assembly to the tractor PTO output shaft 18, the hookup assembly being shown connected to the tractor in FIG. 2. The hookup assembly includes a central telescoping portion 38 between the front and rear universal joints, only the inner and outer shields 40 and 42 respectively for the central telescoping portion of the hookup assembly being illustrated in the drawings.

When the hookup assembly 30 is disconnected from the tractor PTO, its forward end is free to dangle, and a support mechanism, indicated generally by the numeral 43, is provided for selectively supporting the forward free end of the hookup assembly when it is disconnected from the tractor, as shown in FIG. 1. The support mechanism 43 includes an inverted L-shaped support member 44 having a first leg 46, that is vertical when the mechanism is in use, and a horizontal transverse leg 48, extending above and across the tongue. The lower end of the leg 46 is swingably mounted on the side of the tongue 20 by a transverse pivot 50, and a stop member 52 is attached to the side of the tongue 20 above and slightly forwardly of the pivot 50 to engage the front side of the vertical leg 46 of the support member and limit its forward swinging movement to several degrees over center. The support member 44 is swingable rearwardly and downwardly until the horizontal leg 48 engages the top of the tongue 20 as shown in FIG. 2.

The support member is formed from a piece of rod, so that the horizontal leg 48 is cylindrical, and a retainer member 54 is swingably mounted on the horizontal leg 48, the retainer member including a hub 55 having an axial bore that receives the horizontal leg. The hub 55 is retained on the horizontal leg 48 between a pair of washers 56 and 57, the inner washer 56 being welded to the support member while the outer washer 57 is retained on the support member by a cotter pin 58. A relatively short arm or plate 60 extends outwardly from the hub 55, and a generally C-shaped hook element 62 is welded to the arm 60. The hook element 62 is formed from a piece of steel rod and includes a transversely extending top portion 64 that terminates in a free end 66, a central portion 68 that extends downwardly at right angles from the inner end of the top portion, and a somewhat V-shaped bottom portion 70 that terminates in a free end 72 that is spaced from the upper free end 66 to form a generally laterally facing opening 74. The construction of the hook element 62 is shown in greater detail in FIG. 4, although the height of the hook element is somewhat foreshortened since the central portion is disposed at an angle, the central portion lying in a plane that extends at approximately a 45° angle upwardly and forwardly from the vertical plane in which the bottom portion 70 lies when the mechanism is in its operative position as shown in FIG. 1.

In operation, when the hookup assembly 30 is connected to the tractor PTO output shaft 18, the support mechanism 43 can be folded rearwardly to its folded or storage position, as shown in FIG. 2, wherein the support member 44 is swung rearwardly until the hub 55 and the hook element 62 attached thereto engage the top of the tongue 20.

When the hookup assembly 30 is disconnected from the tractor PTO output shaft 18, as shown in FIG. 3, the support mechanism 43 is swung upwardly and forwardly until the support member 44 engages the stop 52. Since the support member 44 has gone over center when it engages the stop 52, the weight of the member will hold it against the stop. The retainer member 54 is then rotated on the upper horizontal leg 48 of the support member until the central portion 68 of the hook element 62 is approximately vertical and lies in a plane that is approximately normal to or transversely related to the axis of the central portion 38 of the hookup assembly as shown in FIG. 3. The distance between the end 66 of the top portion of the hook element and the end 72 of the bottom portion of the hook element is slightly greater than the outside diameter of the central portion 38 of the hookup assembly, so that the opening 74 between the opposite ends of the hook element is sufficient to permit lateral passage of the hookup assembly into the interior of the hook element 62. When this is accomplished, the retainer member 54 and the hook element 62 that is mounted thereon are swung forwardly to a tilted position, wherein the top portion 64 of the hook element engages the top of the hookup assembly, while the bottom portion 70 of the hook element engages the bottom of the hookup assembly, as shown in FIGS. 1 and 4. In this position, the opening 74 in the hook element, or the distance between the ends 66 and 72 of the hook element, is no longer diametrically related to the hookup assembly but rather lies in a plane that is canted relative to the axis of the hookup assembly. In this position, the hookup assembly cannot move through the opening, so the assembly is locked into the hook element. The weight of the hookup assembly tends to hold the retainer member and the hook element in the locked condition, as shown in FIG. 1, and also tends to retain the support member 44 against the stop. As is apparent, the hookup assembly is firmly clamped between the top and bottom portions of the hook element so that the assembly will not loosely bounce around in the hook element.

The support mechanism will accommodate smaller size hookup assemblies, the hook element simply being inclined forwardly at a greater angle before both the top and bottom portions of the hook element engage the hookup assembly. Also, when the hookup assembly is in its stored position, its axis is horizontal or inclined slightly upwardly and forwardly, so that the hookup assembly will tend to stay in its shortest or fully telescoped condition, the clamping action of the support mechanism also resisting extension of the hookup assembly. As is apparent, the support holds the hookup assembly off the ground, so that it does not flop on the ground. The assembly is also held in a position from which it is easy for the operator to complete the power line hookup.

We claim:

1. In an implement having a forwardly extending tongue adapted to be connected to the drawbar of a towing tractor and a drive shaft adapted to be connected to the tractor PTO output shaft by a PTO hookup assembly including a front universal joint connectible to the tractor PTO output shaft, a rear universal joint connected to the implement drive shaft and a tubular outer body portion between the front and rear universal joints, the improvement comprising:

a support member pivotally mounted on the implement tongue generally below the PTO hookup assembly for swinging between a lower inoperative position and a generally upright position;

and a retainer member swingably mounted on the support member and including a generally C-shaped hook element having a lateral opening between the opposite ends of the hook element slightly wider than the diameter of the outer body portion of the hook-up assembly, said hook element being adapted to accommodate passage of the body portion when the retainer member is shifted to a generally vertical position so that the opening of the hook element is disposed diametrically of the body portion, said retainer member being shiftable to a canted position wherein the opening of the hook element in a diametrical direction relative to the body portion is less than the diameter of the body portion, so that the body portion cannot pass through the opening and be withdrawn from the hook element when the retainer member is in its canted position, to selectively lock the hook-up assembly to the support member.

2. The invention defined in claim 1 wherein the support member is pivotally mounted on the tongue for swinging about a transverse pivot axis between said lower inoperative position, wherein it is disposed in a generally fore and aft condition and rests on top of the tongue, and said generally upright condition wherein it is adapted to support the hook-up assembly above the tongue.

3. The invention defined in claim 2 and including a stop mounted on the tongue and engageable with the support member to limit the downward swinging of the support member after it passes an over-center position so that the weight of the support member and the hook-up assembly supported thereon bias the support against the stop.

4. The invention defined in claim 2 wherein the retainer member is swingably mounted on the support member on a transverse pivot means disposed on the upper end of the support member when the support member is in its generally upright condition.

5. The invention defined in claim 1 wherein the weight of the hook-up assembly bearing against the hook element, when the retainer member is in its canted position and the hook-up assembly is retained within the hook element, biases the retainer member toward its canted position.

6. In an implement having a forwardly extending tongue adapted to be connected to the drawbar of a towing tractor and a drive shaft adapted to be connected to the tractor PTO output shaft by a PTO hook-up assembly including a front universal joint connectible to the tractor PTO output shaft, a rear universal joint connected to the implement drive shaft and a tubular outer body portion between the front and rear universal joints, the improvement comprising:

a support member pivotally mounted on the tongue for swinging about a transverse pivot axis between a lower inoperative position and a generally upright condition;

a stop mounted on the tongue and engageable with the support member to limit the downward swinging of the support member after it moves over center from its inoperative position to its generally upright condition, the weight of the support member biasing it against the stop to maintain it in said generally upright position;

and a retainer member mounted on the upper end of the support member and including a hook element adapted to receive and support the body portion of the hook-up assembly when the support member is in its upright position.

7. The invention defined in claim 6 wherein the stop is mounted on the tongue forwardly of the pivot axis of the support member.

8. The invention defined in claim 6 wherein the retainer member is pivotally mounted on the support member for swinging between a first position wherein the hook element is adapted to receive the body portion of the hook-up assembly and a second position wherein the hook element is operative to prevent passage of the body portion into or from the hook element.

9. The invention defined in claim 8 wherein the pivot axis of the retainer member on the support member extends in a transverse direction.

10. The invention defined in claim 9 wherein the hook element is generally C-shaped and has a lateral opening slightly greater that the diameter of the outer body portion of the hookup assembly, the opening being diametrically related to the outer body portion when the retainer member is in its first position.

* * * * *